United States Patent
Zhang (10) Patent No.: US 10,040,950 B2
(45) Date of Patent: Aug. 7, 2018

(54) BZ GLAZE ENAMEL PAINTING MATERIAL COMPOSITION AND PAINTING METHOD

(71) Applicant: Li Zhang, Jinlin (CN)

(72) Inventor: Li Zhang, Jinlin (CN)

( * ) Notice: Subject to any disclaimer, the term of this patent is extended or adjusted under 35 U.S.C. 154(b) by 0 days.

(21) Appl. No.: 14/995,164

(22) Filed: Jan. 13, 2016

(65) Prior Publication Data
US 2017/0198151 A1    Jul. 13, 2017

(51) Int. Cl.
*C09D 5/06* (2006.01)
*C09D 1/00* (2006.01)
*C09D 5/14* (2006.01)

(52) U.S. Cl.
CPC ............... *C09D 5/06* (2013.01); *C09D 1/00* (2013.01); *C09D 5/14* (2013.01)

(58) Field of Classification Search
None
See application file for complete search history.

(56) References Cited

U.S. PATENT DOCUMENTS

| | | | | |
|---|---|---|---|---|
| 6,391,964 B1 * | 5/2002 | Tartaglia | ............ | A61K 8/8152 206/568 |
| 6,582,684 B1 * | 6/2003 | Abrahamson | ........ | A61K 8/0241 424/401 |
| 2003/0185775 A1 * | 10/2003 | DiGiulio | ................. | A61K 8/42 424/61 |

OTHER PUBLICATIONS

Life World Woman (http://lifeworldwomen.blogspot.com/2015/09/negative-space-water-marble-nail-art-in.html; Sep. 17, 2015; LWM).*
Water Marble Nail Art (http://www.instructables.com/id/Water-Marble-Nail-Art/; May 11, 2014; Retrieved on May 18, 2017).*

* cited by examiner

*Primary Examiner* — Francisco W Tschen
(74) *Attorney, Agent, or Firm* — Leong C. Lei (57) ABSTRACT

Provided are a BZ glaze enamel painting material composition and a painting method. The composition is a painting material composition composed of natural mineral pigment powder, synthetic resin, and vinyl acetate-acrylate added with a color glaze, a white toning glaze, and a colorless toning glaze at different percentages. The painting method that uses the composition includes the steps of preparing painting canvas, forming bottom, and making picture. In the step of making picture, a suitable amount of BZ glaze enamel painting material composition is prepared according to the size of the painting canvas and, and after being sufficiently stirred, added with temperature-resistant minerals and water according to predetermined weight ratios to respectively form red glaze, yellow glaze, blue glaze, green glaze, purple glaze, orange glaze, and cyan glaze, followed by mixing to product a BZ painting artwork exhibiting, in the entirety thereof, an irregular pattern.

3 Claims, 11 Drawing Sheets

BZ GLAZE ENAMEL PAINTING MATERIAL COMPOSITION AND PAINTING METHOD

TECHNICAL FIELD OF THE INVENTION

The present invention relates generally to a painting material composition, and more particularly to a BZ (Belousov-Zhabotinskii) glaze enamel painting composition and a painting method.

DESCRIPTION OF THE PRIOR ART

Painting materials as an element of painting are an important part of the art of painting, and different materials express different artistic languages in decorative paintings, producing different visual effects. In recent years, with the development of industrial techniques, new painting materials increasingly emerge. The new materials promote the development of the art of painting, supporting the artists' unlimited exploration of work styles and painting skills. Through a harmonious combination of materials and surprising performance of skills, new visual languages are created, making the works more expressive and artistic appeal.

The perspective of aesthetics of the traditional painting is accurate planar shape, complete visual space, elegant and multi-layered colors, while the new painting materials change the traditional aesthetic perspective by shifting the focus of paintings from purely hand drawing to concerns of the formation of a picture concerns, including the sense of form and dimensions of the work. People are now trying to take advantage of external features and internal physical and chemical characteristics of new painting materials to do painting with the form of expression changed from the traditional way of "artists speaking with materials" to "artists making materials speak".

At the end of the 1950's of the twentieth century, the former Soviet Union scientists Boris Belousov and Anatol Zhabotinskii found in chemical experiments that when appropriate conditions are met, chemicals that participate in the reaction seem receiving, macroscopically, some kind of unified command and exhibit a phenomenon of self-organization of colors or patterns, forming consistent behavior in space and time. Such a phenomenon is generally referred to as "chemical oscillation" and is called "BZ reaction" with the first letter of the names of two scientists.

High-temperature color glazed porcelain plate painting of Jingdezhen is a modern creation made in Jingdezhen, a city of Chain. The porcelain plate painting, which is classified as color-over-glaze, color-under-glaze, and high-temperature color glaze, is a traditional craft from ancient times. The high-temperature color glaze has risen for nearly half a century.

The existing art of high-temperature color glazed porcelain plate painting, when fired at a high temperature of 1,300 degrees to 1,500 degrees, exhibits color change of the color glaze, turning into more vivid variety of saturated colors, but all the pigment is not blending, unlike other kinds of painting, such as painting, gouache, and watercolor, blending between color glazes being not pure and unsaturated.

SUMMARY OF THE INVENTION

The primary object of the present invention is to provide a BZ glaze enamel painting material composition and a painting method.

The present invention provides a BZ glaze enamel painting material composition, which comprises a painting material composition composed of natural mineral pigment powder, synthetic resin, and vinyl acetate-acrylate added with a color glaze, a white toning glaze, and a colorless toning glaze, wherein the color glaze is formed of 60 wt % to 40 wt % of temperature-resistant color glaze minerals and 40 wt % to 60 wt % of water; the white toning glaze is formed of 60 wt % of a temperature-resistant white glaze material and 40 wt % of water; and the colorless toning glaze is formed of 40 wt % of a temperature-resistant colorless glaze mineral and 60 wt % of water. Based on the total weight of the composition, the content of the natural mineral pigment powder is 5% by weight; the content of the synthetic resin is 3% by weight; and the content of the vinyl acetate-acrylate is 2% by weight. The composition may further comprise a lubricant and the weight percent of the lubricant does not exceed 3%. The composition may also comprise a disinfectant and the weight percentage of the disinfectant does not exceed 2%.

The present invention discloses a composition that serves as a painting material, wherein each ingredient component is readily available in the market. The ingredient components are mixed in accordance with appropriate ratios and used according to the steps and process conditions disclosed in the present invention so as to obtain an artwork of an irregular pattern. A number of pieces of the artworks have been put in auction markets and achieve good returns. Further, the technical solution disclosed in the present invention is also applicable to decoration industries, such as formation of background walls, making it high in market value. Moreover, the painting material composition prepared according to the present invention and the operation of painting works can be achieved by hands of the artists based on experience and can also produced in an industrialized manner by taking advantage of modern industrial technology, providing a variety of ways for the production of such works.

The creation and innovation of the "BZ Art" high-temperature color glazed porcelain plate paintings solves the issue of blending and penetration between glazes of colors to provide all the colors of the colorful world, adding charm of art to the world.

The creation and success of the "BZ Art" high-temperature color glaze is evolution of technology of the history, not only changing the integration between various color glazes but also making the colors purer, more saturated, and more gorgeous.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

The present invention provides a BZ glaze enamel painting material composition, which comprises a painting material composition composed of natural mineral pigment powder, synthetic resin, and vinyl acetate-acrylate (which is an aqueous polymer resin formed by copolymerization of vinyl acetate and butyl acrylate as primary functional monomers), added with a color glaze, a white toning glaze, and a colorless toning glaze, wherein the color glaze is formed of 60 wt % to 40 wt % of temperature-resistant color glaze minerals and 40 wt % to 60 wt % of water; the white toning glaze is formed of 60 wt % of a temperature-resistant white glaze material and 40 wt % of water; and the colorless toning glaze is formed of 40 wt % of a temperature-resistant colorless glaze mineral and 60 wt % of water.

To improve the flowability of the painting material composition according to the present invention, a lubricant may be added in the painting material compositing. The weight percentage of the lubricant does not exceed 3%. Further, to improve the stability of a final artwork and to extend the time of preservation, a disinfectant may be added in the above painting material composition and the weight percentage of the disinfectant does not exceed 2%.

The present invention also provides a painting method for the above painting material composition. The method comprises steps of preparation of painting canvas, formation of bottom, and making picture, and post treatment.

Firstly, for the preparation of painting canvas, a piece of natural linen cloth having a predetermined size is chosen as painting canvas according to the desired size of painting, which is subjected to treatment for water resistance and fixation. For example, a glue liquid formed of rabbit-skin glue and water at a ratio of 1:10 by weight and the painting canvas is uniformly brushed with the glue liquid for two to three times. After each brushing operation, complete drying is necessary before the application of the next brushing operation. The glue liquid formed of the rabbit-skin glue and water is made with a process of boiling in a manner of being separated from water and stirring is continuously conducted during the boiling process.

Next, for formation of bottom, brushing primer on the linen cloth for bottoming on the painting canvas and color rendering. The primer can be formed of one part of water, one part of titanium white powder, one part of chalky white powder, and one part of polyvinyl acetate, by weight. The primer is brushed on the painting canvas as underlying and then completely dried.

Then, for making picture, the bottom completed canvas is fixed to a back board. A suitable amount of BZ glaze enamel painting material composition described previously is prepared according to the size of the painting canvas and, after being sufficiently stirred, is added with temperature-resistant minerals and water according to the following weight ratios to respectively form red glaze, yellow glaze, blue glaze, green glaze, purple glaze, orange glaze, and cyan glaze:

The ratio of red glaze mineral and water is 60%:40%;
the ratio of yellow glaze mineral and water is 55%:45%;
the ratio of blue glaze mineral and water is 65%:35%;
the ratio of green glaze mineral and water is 63%:37%;
the ratio of purple glaze mineral and water is 70%:30%;
the ratio of orange glaze mineral and water is 68%:32%; and
the ratio of cyan glaze mineral and water is 71%:29%.

After sufficient stirring, it is uniformly applied to the entire canvas. After being placed still for 5-10 minutes, black powder or white powder of natural minerals is added homogeneously, with the weight of the black powder or white powder being 5% of the total weight of the BZ glaze enamel painting material composition, whereby with the lapse of time, an irregular pattern gradually appears on the painting canvas and a final pattern is exhibited on the canvas after about 12 hours.

Finally, for post treatment, after the pattern is fixed and no longer varies, the painting canvas is placed still horizontally for drying under room temperature for 48-72 hours to be completely and naturally dried. After being completely dried, the painting canvas with the pattern thereon is removed from the back board and regular operations, such as framing, can be performed as necessary.

In the following, BZ art pictures made according to Embodiments 1-11 of the present invention will be presented.

Figure 1:
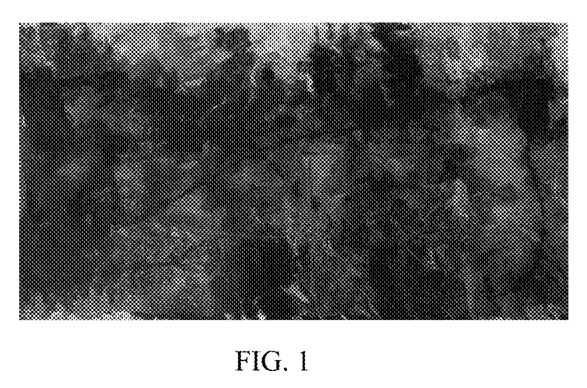
FIG. 1 is a BZ art picture made according to Embodiment 1 of the present invention.

Embodiment 1: Making a BZ Art Painting Work Having a Size of 180 cm×95 cm

Preparation of BZ glaze enamel painting material composition: a painting material composition composed of natural mineral pigment powder (5 grams), synthetic resin (3 grams), and vinyl acetate-acrylate (2 grams) is formed and further added with a color glaze, a white toning glaze, and a colorless toning glaze, wherein the color glaze is formed of 60 wt % to 40 wt % of temperature-resistant color glaze minerals and 40 wt % to 60 wt % of water; the white toning glaze is formed of 60 wt % of a temperature-resistant white glaze material and 40 wt % of water; and the colorless toning glaze is formed of 40 wt % of a temperature-resistant colorless glaze mineral and 60 wt % of water. The instant embodiment uses the BZ glaze enamel painting material composition to make an irregular BZ pattern painting artwork having a size of 180 cm×95 cm, comprising steps of preparation of painting canvas, formation of bottom, and making picture, and post treatment.

The step of preparation of painting canvas:

Apiece of natural linen cloth having a suitable size is chosen as painting canvas according to a desired size of the painting, which is subjected to treatment for water resistance and fixation. For example, a glue liquid formed of rabbit-skin glue and water at a ratio of 1:10 by weight and the painting canvas is uniformly brushed with the glue liquid for two to three times. After each brushing operation, complete drying is necessary before the application of the next brushing operation. The glue liquid formed of the rabbit-skin glue and water is made with a process of boiling in a manner of being separated from water and stirring is continuously conducted during the boiling process.

The step of formation of bottom: brushing primer on the linen cloth for bottoming on the painting canvas and color rendering. The primer can be formed of one part of water, one part of titanium white powder, one part of chalky white powder, and one part of polyvinyl acetate, by weight. The primer is brushed on the painting canvas as underlying and then completely dried.

The step of making picture: the bottom completed canvas is fixed to a back board. A suitable amount of BZ glaze enamel painting material composition described previously is prepared according to the size of the painting canvas and, after being sufficiently stirred, is added with temperature-resistant minerals and water according to the following weight ratio to respectively form red glaze, yellow glaze, blue glaze, green glaze, purple glaze, orange glaze, and cyan glaze:

The ratio of red glaze mineral and water is 60%:40%;
the ratio of yellow glaze mineral and water is 55%:45%;
the ratio of blue glaze mineral and water is 65%:35%;
the ratio of green glaze mineral and water is 63%:37%;
the ratio of purple glaze mineral and water is 70%:30%;
the ratio of orange glaze mineral and water is 68%:32%; and
the ratio of cyan glaze mineral and water is 71%:29%.

After sufficient stirring, it is uniformly applied to the entire canvas. After being placed still for 5-10 minutes, black powder or white powder of natural minerals is added homogeneously, with the weight of the black powder or white powder being 5% of the total weight of the BZ glaze enamel painting material composition, whereby with the lapse of time, an irregular pattern gradually appears on the painting canvas and a final pattern is exhibited on the canvas after about 12 hours.

Finally, for post treatment, after the pattern is fixed and no longer varies, the painting canvas is placed still horizontally for drying under room temperature for 48-72 hours to be completely and naturally dried. After being completely dried, the painting canvas with the pattern thereon is removed from the back board and regular operations, such as framing, can be performed as necessary.

Figure 2:
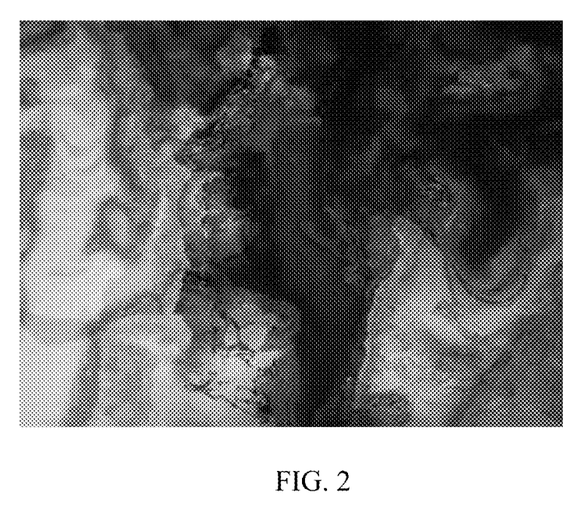
FIG. 2 is a BZ art picture made according to Embodiment 2 of the present invention.

Embodiment 2: Making a BZ Art Painting Work Having a Size of 180 cm×95 cm

Preparation of BZ glaze enamel painting material composition: a painting material composition composed of natural mineral pigment powder (5 grams), synthetic resin (3 grams), and vinyl acetate-acrylate (2 grams) is formed and further added with a color glaze, a white toning glaze, and a colorless toning glaze, wherein the color glaze is formed of 60 wt % to 40 wt % of temperature-resistant color glaze minerals and 40 wt % to 60 wt % of water; the white toning glaze is formed of 60 wt % of a temperature-resistant white glaze material and 40 wt % of water; and the colorless toning glaze is formed of 40 wt % of a temperature-resistant colorless glaze mineral and 60 wt % of water.

The instant embodiment uses the BZ glaze enamel painting material composition prepared previously to make a BZ pattern painting artwork by following the same process and steps of those of Embodiment 1, so that repeated description will be omitted. It is noted here that in the step of making picture: a suitable amount of BZ glaze enamel painting material composition described previously is prepared according to the size of the painting canvas and, after being sufficiently stirred, is added with temperature-resistant minerals and water according to the following weight ratio to respectively form red glaze, yellow glaze, blue glaze, green glaze, purple glaze, orange glaze, and cyan glaze:

The ratio of red glaze mineral and water is 60%:40%;
the ratio of yellow glaze mineral and water is 55%:45%;
the ratio of blue glaze mineral and water is 65%:35%;
the ratio of green glaze mineral and water is 63%:37%;
the ratio of purple glaze mineral and water is 70%:30%;
the ratio of orange glaze mineral and water is 68%:32%; and
the ratio of cyan glaze mineral and water is 71%:29%.

After sufficient stirring, it is uniformly applied to the entire canvas. After being placed still for 5-10 minutes, black powder or white powder of natural minerals is added homogeneously, with the weight of the black powder or white powder being 5% of the total weight of the BZ glaze enamel painting material composition, whereby with the lapse of time, an irregular pattern gradually appears on the painting canvas and a final pattern is exhibited on the canvas after about 12 hours.

Finally, for post treatment, after the pattern is fixed and no longer varies, the painting canvas is placed still horizontally for drying under room temperature for 48-72 hours to be completely and naturally dried. After being completely dried, the painting canvas with the pattern thereon is removed from the back board and regular operations, such as framing, can be performed as necessary.

Figure 3:
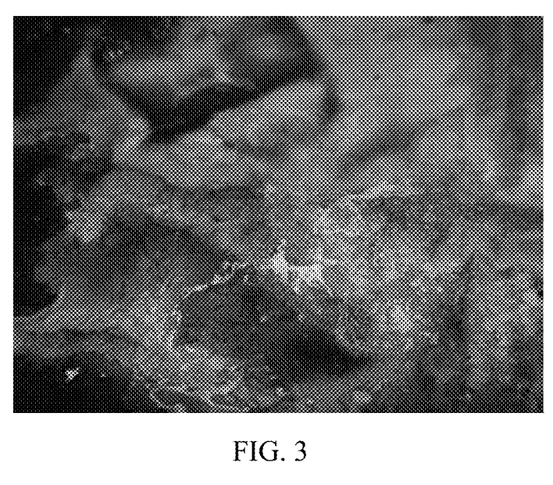
FIG. 3 is a BZ art picture made according to Embodiment 3 of the present invention.

Embodiment 3: Making a BZ Art Painting Work Having a Size of 180 cm×95 cm

Preparation of BZ glaze enamel painting material composition: a painting material composition composed of natural mineral pigment powder (5 grams), synthetic resin (3 grams), and vinyl acetate-acrylate (2 grams) is formed and further added with a color glaze, a white toning glaze, and a colorless toning glaze, wherein the color glaze is formed of 60 wt % to 40 wt % of temperature-resistant color glaze minerals and 40 wt % to 60 wt % of water; the white toning glaze is formed of 60 wt % of a temperature-resistant white glaze material and 40 wt % of water; and the colorless toning glaze is formed of 40 wt % of a temperature-resistant colorless glaze mineral and 60 wt % of water.

The instant embodiment uses the BZ glaze enamel painting material composition prepared previously to make an irregular BZ pattern painting artwork by following the same process and steps of those of Embodiment 1, so that repeated description will be omitted. It is noted here that in the step of making picture: a suitable amount of BZ glaze enamel painting material composition described previously is prepared according to the size of the painting canvas and, after being sufficiently stirred, is added with temperature-resistant minerals and water according to the following weight ratio to respectively form red glaze, yellow glaze, blue glaze, green glaze, purple glaze, orange glaze, and cyan glaze:

The ratio of red glaze mineral and water is 60%:40%;
the ratio of yellow glaze mineral and water is 55%:45%;
the ratio of blue glaze mineral and water is 65%:35%;
the ratio of green glaze mineral and water is 63%:37%;
the ratio of purple glaze mineral and water is 70%:30%;
the ratio of orange glaze mineral and water is 68%:32%; and
the ratio of cyan glaze mineral and water is 71%:29%.

After sufficient stirring, it is uniformly applied to the entire canvas. After being placed still for 5-10 minutes, black powder or white powder of natural minerals is added homogeneously, with the weight of the black powder or white powder being 5% of the total weight of the BZ glaze enamel painting material composition, whereby with the lapse of time, an irregular pattern gradually appears on the painting canvas and a final pattern is exhibited on the canvas after about 12 hours.

Finally, for post treatment, after the pattern is fixed and no longer varies, the painting canvas is placed still horizontally for drying under room temperature for 48-72 hours to be completely and naturally dried. After being completely dried, the painting canvas with the pattern thereon is removed from the back board and regular operations, such as framing, can be performed as necessary.

Figure 4:
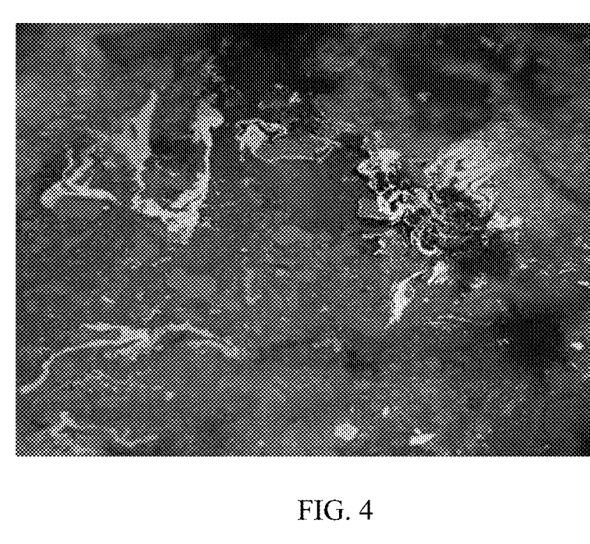
FIG. 4 is a BZ art picture made according to Embodiment 4 of the present invention.

Embodiment 4: Making a BZ Art Painting Work Having a Size of 180 cm×95 cm

Preparation of BZ glaze enamel painting material composition: a painting material composition composed of natural mineral pigment powder (5 grams), synthetic resin (3 grams), and vinyl acetate-acrylate (2 grams) is formed and further added with a color glaze, a white toning glaze, and a colorless toning glaze, wherein the color glaze is formed of 60 wt % to 40 wt % of temperature-resistant color glaze minerals and 40 wt % to 60 wt % of water; the white toning glaze is formed of 60 wt % of a temperature-resistant white glaze material and 40 wt % of water; and the colorless toning glaze is formed of 40 wt % of a temperature-resistant colorless glaze mineral and 60 wt % of water.

The instant embodiment uses the BZ glaze enamel painting material composition prepared previously to make a BZ pattern painting artwork by following the same process and steps of those of Embodiment 1, so that repeated description will be omitted. It is noted here that in the step of making picture: a suitable amount of BZ glaze enamel painting material composition described previously is prepared according to the size of the painting canvas and, after being sufficiently stirred, is added with temperature-resistant minerals and water according to the following weight ratio to respectively form red glaze, yellow glaze, blue glaze, green glaze, purple glaze, orange glaze, and cyan glaze:

The ratio of red glaze mineral and water is 60%:40%;
the ratio of yellow glaze mineral and water is 55%:45%;
the ratio of blue glaze mineral and water is 65%:35%;
the ratio of green glaze mineral and water is 63%:37%;
the ratio of purple glaze mineral and water is 70%:30%;
the ratio of orange glaze mineral and water is 68%:32%; and
the ratio of cyan glaze mineral and water is 71%:29%.

After sufficient stirring, it is uniformly applied to the entire canvas. After being placed still for 5-10 minutes, black powder or white powder of natural minerals is added homogeneously, with the weight of the black powder or white powder being 5% of the total weight of the BZ glaze enamel painting material composition, whereby with the lapse of time, an irregular pattern gradually appears on the painting canvas and a final pattern is exhibited on the canvas after about 12 hours.

Finally, for post treatment, after the pattern is fixed and no longer varies, the painting canvas is placed still horizontally for drying under room temperature for 48-72 hours to be completely and naturally dried. After being completely dried, the painting canvas with the pattern thereon is removed from the back board and regular operations, such as framing, can be performed as necessary.

Figure 5:
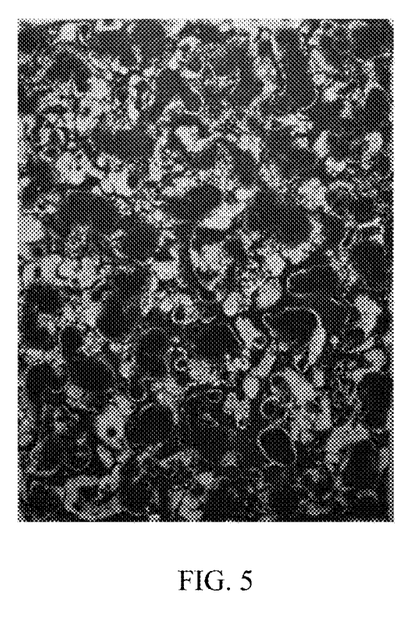
FIG. 5 is a BZ art picture made according to Embodiment 5 of the present invention.

Embodiment 5: Making a BZ Art Painting Work Having a Size of 120 cm×90 cm

Preparation of BZ glaze enamel painting material composition: a painting material composition composed of natural mineral pigment powder (5 grams), synthetic resin (3 grams), and vinyl acetate-acrylate (2 grams) is formed and further added with a color glaze, a white toning glaze, and a colorless toning glaze, wherein the color glaze is formed of 60 wt % to 40 wt % of temperature-resistant color glaze minerals and 40 wt % to 60 wt % of water; the white toning glaze is formed of 60 wt % of a temperature-resistant white glaze material and 40 wt % of water; and the colorless toning glaze is formed of 40 wt % of a temperature-resistant colorless glaze mineral and 60 wt % of water.

The instant embodiment uses the BZ glaze enamel painting material composition prepared previously to make a BZ pattern painting artwork by following the same process and steps of those of Embodiment 1, so that repeated description will be omitted. It is noted here that in the step of making picture: a suitable amount of BZ glaze enamel painting material composition described previously is prepared according to the size of the painting canvas and, after being sufficiently stirred, is added with temperature-resistant minerals and water according to the following weight ratio to respectively form red glaze, yellow glaze, blue glaze, green glaze, purple glaze, orange glaze, and cyan glaze:

The ratio of red glaze mineral and water is 60%:40%;
the ratio of yellow glaze mineral and water is 55%:45%;
the ratio of blue glaze mineral and water is 65%:35%;
the ratio of green glaze mineral and water is 63%:37%;
the ratio of purple glaze mineral and water is 70%:30%;
the ratio of orange glaze mineral and water is 68%:32%; and
the ratio of cyan glaze mineral and water is 71%:29%.

After sufficient stirring, it is uniformly applied to the entire canvas. After being placed still for 5-10 minutes, black powder or white powder of natural minerals is added homogeneously, with the weight of the black powder or white powder being 5% of the total weight of the BZ glaze enamel painting material composition, whereby with the lapse of time, an irregular pattern gradually appears on the painting canvas and a final pattern is exhibited on the canvas after about 12 hours.

Finally, for post treatment, after the pattern is fixed and no longer varies, the painting canvas is placed still horizontally for drying under room temperature for 48-72 hours to be completely and naturally dried. After being completely dried, the painting canvas with the pattern thereon is removed from the back board and regular operations, such as framing, can be performed as necessary.

Figure 6:
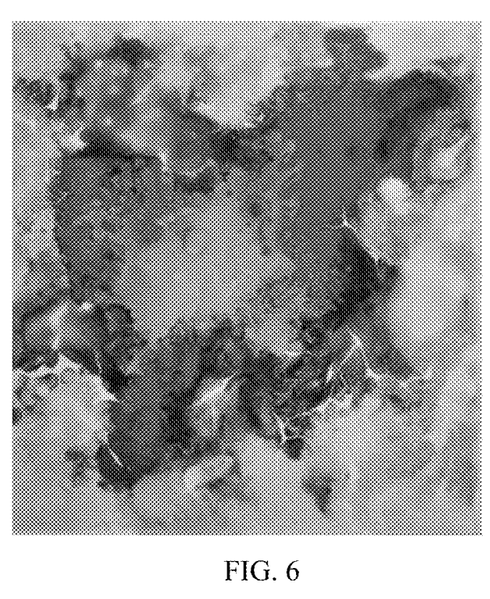
FIG. 6 is a BZ art picture made according to Embodiment 6 of the present invention.

Embodiment 6: Making a BZ High-Temperature Color Glazed Porcelain Plate Painting Having a Size of 55 cm×55 cm Kaolin clay (especially unique local Kaolin clay of Jingdezhen) is added with water at a ratio of 7:3 and stirred into a blank form, and then pressed, with iron rods, into plates of different sizes that are flat and smooth as a mirror and have a thickness of 2-3 cm, and then dried without being directly exposed to sunlight to dry for about a week.

Each colors glaze is formed of pure natural temperature-resistant mineral and water:

The ratio of red glaze mineral and water is 55%:45%;
the ratio of yellow glaze mineral and water is 50%:50%;
the ratio of blue glaze mineral and water is 60%:40%;
the ratio of green glaze mineral and water is 58%:42%;
the ratio of purple glaze mineral and water is 65%:35%;
the ratio of orange glaze mineral and water is 63%:37%; and
the ratio of cyan glaze mineral and water is 66%:34%.

After the above color glazes have been obtained, adding a white toning glaze and colorless toning glaze in each of color glazes, wherein the white toning glaze is formed of 70 wt % of a temperature-resistant white glaze material and 30 wt % of water and the colorless toning glaze is formed of 30 wt % of a temperature-resistant colorless glaze mineral and 70 wt % of water:

Each 500 g red color glaze is added with 10 g white toning glaze and 5 g colorless toning glaze;
each 500 g yellow color glaze is added with 15 g white toning glaze and 10 g colorless toning glaze;
each 500 g blue color glaze is added with 20 g white toning glaze and 15 g colorless toning glaze;
each 500 g green color glaze is added with 25 g white toning glaze and 20 g colorless toning glaze;
each 500 g purple color glaze is added with 30 g white toning glaze and 15 g colorless toning glaze;
each 500 g orange color glaze is added with 35 g white toning glaze and 20 g colorless toning glaze; and
each 500 g cyan color glaze is added with 40 g white toning glaze and 25 g colorless toning glaze;

The various high-temperature color glaze painting material obtained with the above-listed ratio, when applied to porcelain plate painting, allows for integration of the various colors, making the colors purer, more saturated, and more gorgeous, this being also included in the protection scope pursued by the present invention.

Then, the variety of color glaze that are added with white toning glaze and colorless toning glaze are used for painting by following the following steps and sequence: first painting red, yellow, blue, green, purple, orange, and cyan respectively on dried porcelain plates. Of course, the above provides just the most preferred way of embodiment. Similarly, using only some of the color glazes, including at least red, yellow, and blue colors, added white toning glaze and colorless toning glaze, following the above provided ratio and painting sequence, may also achieve the same BZ artistic effect.

The preferred time for making high-temperature color glazed porcelain plate painting is between September and October in Jingdezhen, where the temperature and humidity of this time are best for porcelain painting.

Kiln firing is preferred done with a gas kiln, and less preferred being an electric kiln and a wood kiln. The temperature for firing of the porcelain plate in the first day is controlled a high temperature of 500-600 degrees, the second day being controlled at a high temperature of 600-800 degrees, the third day being controlled at a high temperature of 1,300-1,350 degrees, and after that, burning for firing is stopped to allow for natural cooling in the kiln for three to four days until the temperature gets close to the outside temperature, when the product can be removed out of the kiln.

Figure 7:
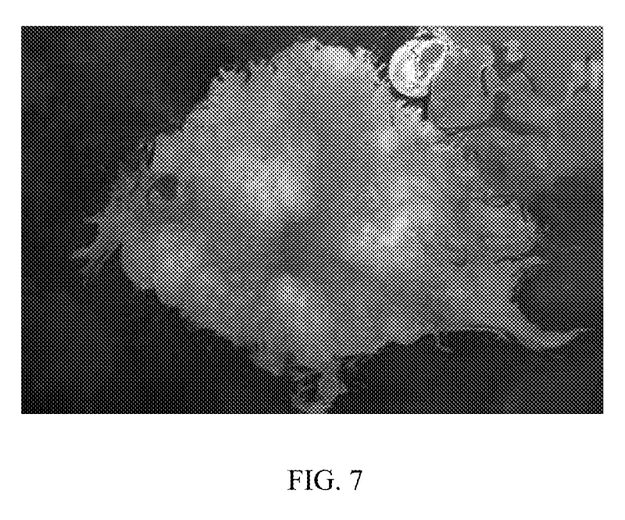
FIG. 7 is a BZ art picture made according to Embodiment 7 of the present invention.

Embodiment 7: Making a BZ Painting Artwork Organic Glass a Size of 180 cm×120 cm In addition to BZ high-temperature color glazed porcelain plate painting and BZ art painting cloth painting, BZ artistic paintings may also be achieved on organic glass. The organic glass can be purchased directly on the market, and the painting method is the same that conducted on painting canvas and porcelain plate. After painting, the organic glass is allowed to dry naturally at room temperature (about zero to 50 degrees indoors).

Figure 8:
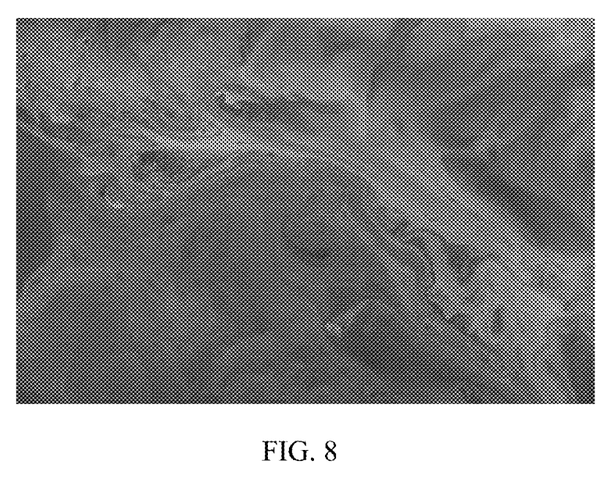
FIG. 8 is a BZ art picture made according to Embodiment 8 of the present invention.

Embodiment 8: Making a BZ Painting Artwork Organic Glass a Size of 180 cm×120 cm In addition to BZ high-temperature color glazed porcelain plate painting and BZ art painting cloth painting, BZ artistic paintings may also be achieved on organic glass. The organic glass can be purchased directly on the market, and the painting method is the same that conducted on painting canvas and porcelain plate. After painting, the organic glass is allowed to dry naturally at room temperature (about zero to 50 degrees indoors).

Figure 9:
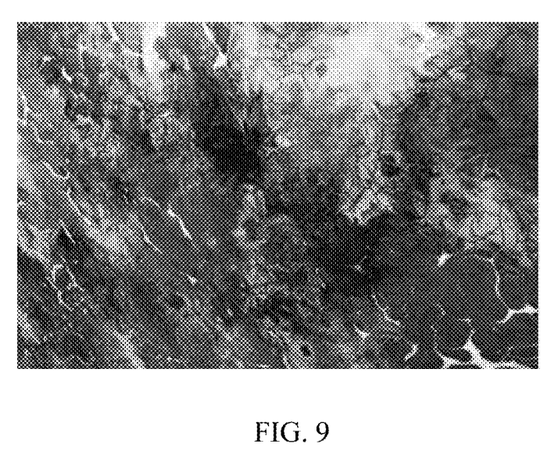
FIG. 9 is a BZ art picture made according to Embodiment 9 of the present invention.

Embodiment 9: Making a BZ High-Temperature Color Glazed Porcelain Plate Painting Having a Size of 170 cm×84 cm Kaolin clay (especially unique local Kaolin clay of Jingdezhen) is added with water at a ratio of 7:3 and stirred into a blank form, and then pressed, with iron rods, into plates of different sizes that are flat and smooth as a mirror and have a thickness of 2-3 cm, and then dried without being directly exposed to sunlight to dry for about a week.

Each colors glaze is formed of pure natural temperature-resistant mineral and water:

The ratio of red glaze mineral and water is 55%:45%;
the ratio of yellow glaze mineral and water is 50%:50%;
the ratio of blue glaze mineral and water is 60%:40%;
the ratio of green glaze mineral and water is 58%:42%;
the ratio of purple glaze mineral and water is 65%:35%;
the ratio of orange glaze mineral and water is 63%:37%; and
the ratio of cyan glaze mineral and water is 66%:34%.

After the above color glazes have been obtained, adding a white toning glaze and colorless toning glaze in each of color glazes, wherein the white toning glaze is formed of 70 wt % of a temperature-resistant white glaze material and 30 wt % of water and the colorless toning glaze is formed of 30 wt % of a temperature-resistant colorless glaze mineral and 70 wt % of water:

Each 500 g red color glaze is added with 10 g white toning glaze and 5 g colorless toning glaze;
each 500 g yellow color glaze is added with 15 g white toning glaze and 10 g colorless toning glaze;
each 500 g blue color glaze is added with 20 g white toning glaze and 15 g colorless toning glaze;
each 500 g green color glaze is added with 25 g white toning glaze and 20 g colorless toning glaze;
each 500 g purple color glaze is added with 30 g white toning glaze and 15 g colorless toning glaze;
each 500 g orange color glaze is added with 35 g white toning glaze and 20 g colorless toning glaze; and
each 500 g cyan color glaze is added with 40 g white toning glaze and 25 g colorless toning glaze;

The various high-temperature color glaze painting material obtained with the above-listed ratio, when applied to porcelain plate painting, allows for integration of the various colors, making the colors purer, more saturated, and more gorgeous, this being also included in the protection scope pursued by the present invention.

Figure 10:
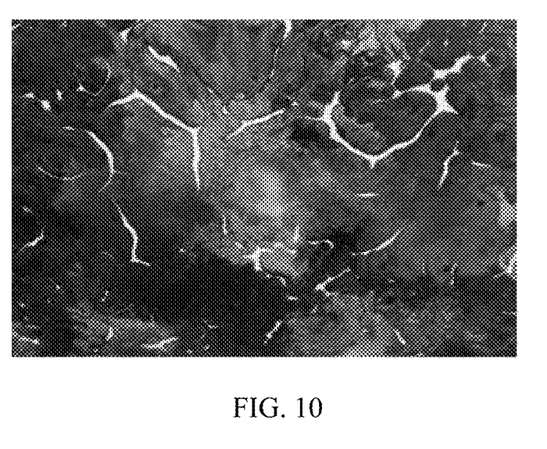
FIG. 10 is a BZ art picture made according to Embodiment 10 of the present invention.

Embodiment 10: Making a BZ High-Temperature Color Glazed Porcelain Plate Painting Having a Size of 170 cm×84 cm Kaolin clay (especially unique local Kaolin clay of Jingdezhen) is added with water at a ratio of 7:3 and stirred into a blank form, and then pressed, with iron rods, into plates of different sizes that are flat and smooth as a mirror and have a thickness of 2-3 cm, and then dried without being directly exposed to sunlight to dry for about a week.

Each colors glaze is formed of pure natural temperature-resistant mineral and water:

The ratio of red glaze mineral and water is 55%:45%;
the ratio of yellow glaze mineral and water is 50%:50%;
the ratio of blue glaze mineral and water is 60%:40%;
the ratio of green glaze mineral and water is 58%:42%;
the ratio of purple glaze mineral and water is 65%:35%;
the ratio of orange glaze mineral and water is 63%:37%; and
the ratio of cyan glaze mineral and water is 66%:34%.

After the above color glazes have been obtained, adding a white toning glaze and colorless toning glaze in each of color glazes, wherein the white toning glaze is formed of 70 wt % of a temperature-resistant white glaze material and 30 wt % of water and the colorless toning glaze is formed of 30 wt % of a temperature-resistant colorless glaze mineral and 70 wt % of water:

Each 500 g red color glaze is added with 10 g white toning glaze and 5 g colorless toning glaze;
each 500 g yellow color glaze is added with 15 g white toning glaze and 10 g colorless toning glaze;
each 500 g blue color glaze is added with 20 g white toning glaze and 15 g colorless toning glaze;
each 500 g green color glaze is added with 25 g white toning glaze and 20 g colorless toning glaze;
each 500 g purple color glaze is added with 30 g white toning glaze and 15 g colorless toning glaze;
each 500 g orange color glaze is added with 35 g white toning glaze and 20 g colorless toning glaze; and
each 500 g cyan color glaze is added with 40 g white toning glaze and 25 g colorless toning glaze;

The various high-temperature color glaze painting material obtained with the above-listed ratio, when applied to porcelain plate painting, allows for integration of the various colors, making the colors purer, more saturated, and more gorgeous, this being also included in the protection scope pursued by the present invention.

Figure 11:
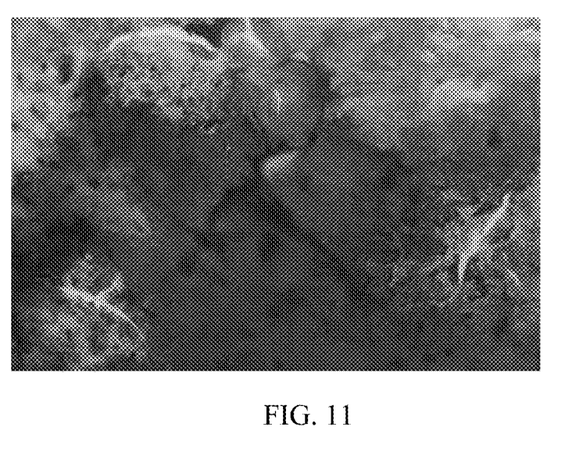
FIG. 11 is a BZ art picture made according to Embodiment 11 of the present invention.

Embodiment 11: Making a BZ High-Temperature Color Glazed Porcelain Plate Painting Having a Size of 170 cm×84 cm Kaolin clay (especially unique local Kaolin clay of Jingdezhen) is added with water at a ratio of 7:3 and stirred into a blank form, and then pressed, with iron rods, into plates of different sizes that are flat and smooth as a mirror and have a thickness of 2-3 cm, and then dried without being directly exposed to sunlight to dry for about a week.

Each colors glaze is formed of pure natural temperature-resistant mineral and water:

The ratio of red glaze mineral and water is 55%:45%;
the ratio of yellow glaze mineral and water is 50%:50%;
the ratio of blue glaze mineral and water is 60%:40%;
the ratio of green glaze mineral and water is 58%:42%;
the ratio of purple glaze mineral and water is 65%:35%;
the ratio of orange glaze mineral and water is 63%:37%; and
the ratio of cyan glaze mineral and water is 66%:34%.

After the above color glazes have been obtained, adding a white toning glaze and colorless toning glaze in each of color glazes, wherein the white toning glaze is formed of 70 wt % of a temperature-resistant white glaze material and 30 wt % of water and the colorless toning glaze is formed of 30 wt % of a temperature-resistant colorless glaze mineral and 70 wt % of water:

Each 500 g red color glaze is added with 10 g white toning glaze and 5 g colorless toning glaze;
each 500 g yellow color glaze is added with 15 g white toning glaze and 10 g colorless toning glaze;
each 500 g blue color glaze is added with 20 g white toning glaze and 15 g colorless toning glaze;
each 500 g green color glaze is added with 25 g white toning glaze and 20 g colorless toning glaze;
each 500 g purple color glaze is added with 30 g white toning glaze and 15 g colorless toning glaze;
each 500 g orange color glaze is added with 35 g white toning glaze and 20 g colorless toning glaze; and
each 500 g cyan color glaze is added with 40 g white toning glaze and 25 g colorless toning glaze;

The various high-temperature color glaze painting material obtained with the above-listed ratio, when applied to porcelain plate painting, allows for integration of the various colors, making the colors purer, more saturated, and more gorgeous, this being also included in the protection scope pursued by the present invention.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A Belousov-Zhabotinskii (BZ) glaze enamel painting material composition, which comprises a painting material composition, a color glaze, a white toning glaze, and a colorless toning glaze, wherein the painting material composition is composed of natural mineral pigment powder, synthetic resin, and vinyl acetate-acrylate wherein the color glaze is formed of 60 wt % to 40 wt % of temperature-resistant color glaze minerals and 40 wt % to 60 wt % of water; the white toning glaze is formed of 60 wt % of a temperature-resistant white glaze material and 40 wt % of water; and the colorless toning glaze is formed of 40 wt % of a temperature-resistant colorless glaze mineral and 60 wt % of water;

wherein based on the total weight of the Belousov-Zhabotinskii (BZ) glaze enamel painting material composition, the content of the natural mineral pigment powder is 5% by weight; the content of the synthetic resin is 3% by weight; and the content of the vinyl acetate-acrylate is 2% by weight;

wherein with laps of time, the BZ glaze enamel painting material composition forms an irregular pattern gradually appearing on a painting canvas and a final pattern is exhibited on the canvas after 12 hours.

2. The BZ glaze enamel painting material composition according to claim 1 further comprising lubricant having a weight percent not exceeding 3%.

3. The BZ glaze enamel painting material composition according to claim 1 further comprising disinfectant having a weight percentage not exceeding 2%.

* * * * *